United States Patent
Kepler et al.

(10) Patent No.: US 12,091,144 B2
(45) Date of Patent: Sep. 17, 2024

(54) RETRACTABLE SOLAR ARRAYS FOR UNMANNED UNDERWATER VEHICLES

(71) Applicant: BAE Systems Information and Electronic Systems Inc., Nashua, NH (US)

(72) Inventors: Matthew F. Kepler, Austin, TX (US); Jerrod S. Allen, Austin, TX (US); John C. Cobb, III, Plymouth, MA (US); Jeffrey Smith, Pembroke, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 393 days.

(21) Appl. No.: 17/645,468

(22) Filed: Dec. 22, 2021

(65) Prior Publication Data
US 2023/0192253 A1 Jun. 22, 2023

(51) Int. Cl.
*B63G 8/00* (2006.01)
*B63B 79/10* (2020.01)
*H02J 7/35* (2006.01)
*H02S 10/40* (2014.01)
*H02S 30/20* (2014.01)
*H02S 40/10* (2014.01)
*H02S 40/38* (2014.01)

(52) U.S. Cl.
CPC .............. *B63G 8/001* (2013.01); *B63B 79/10* (2020.01); *H02J 7/35* (2013.01); *H02S 10/40* (2014.12); *H02S 30/20* (2014.12); *H02S 40/10* (2014.12); *H02S 40/38* (2014.12)

(58) Field of Classification Search
CPC ......... B63G 8/001; H02S 10/40; H02S 30/20; H02S 40/38; H02S 40/10; B63B 79/10; H02J 7/35
See application file for complete search history.

(56) References Cited

U.S. PATENT DOCUMENTS

| | | | |
|---|---|---|---|
| 5,433,259 A | 7/1995 | Faludy | |
| 5,737,279 A * | 4/1998 | Carter | G10K 11/006 367/173 |
| 7,077,072 B2 | 7/2006 | Wingett et al. | |
| 7,789,723 B2 | 9/2010 | Dane et al. | |

(Continued)

FOREIGN PATENT DOCUMENTS

| | | |
|---|---|---|
| CN | 104590496 | 5/2015 |
| CN | 105109655 A | 12/2015 |
| EP | 2048455 A2 | 4/2009 |

OTHER PUBLICATIONS

International Search Report, PCT/US22/53640, mailed Jun. 7, 2023, 11 pages.

*Primary Examiner* — Stephen P Avila
(74) *Attorney, Agent, or Firm* — KPIP Law, PLLC; Gary McFaline

(57) ABSTRACT

The system and method of retractable solar arrays for underwater vehicles. In some cases, the retractable solar arrays for underwater vehicles contain anti-biofouling mechanisms. The retractable solar arrays may extend in a linear or a fan-like manner. In some cases, the solar array may be wrapped around the outside of the underwater vehicle or within a cylindrical housing. In some cases the solar array is a single flexible member with a series of connected panels.

20 Claims, 18 Drawing Sheets

(56) References Cited

U.S. PATENT DOCUMENTS

| | | |
|---|---|---|
| 8,664,511 B2 | 3/2014 | Swatek et al. |
| 10,472,034 B1 | 11/2019 | Webb et al. |
| 2003/0015625 A1 | 1/2003 | McGee et al. |
| 2010/0065104 A1 | 3/2010 | Baruh |
| 2011/0168235 A1* | 7/2011 | Rosa Clot .......... H01L 31/0521 |
| | | 136/246 |
| 2011/0214667 A1 | 9/2011 | Baruh |
| 2014/0125134 A1* | 5/2014 | Van Straten .......... E04H 12/182 |
| | | 320/101 |
| 2019/0134822 A1 | 5/2019 | Clemenzi et al. |
| 2020/0156753 A1* | 5/2020 | Rikoski .................. H02S 40/38 |

* cited by examiner

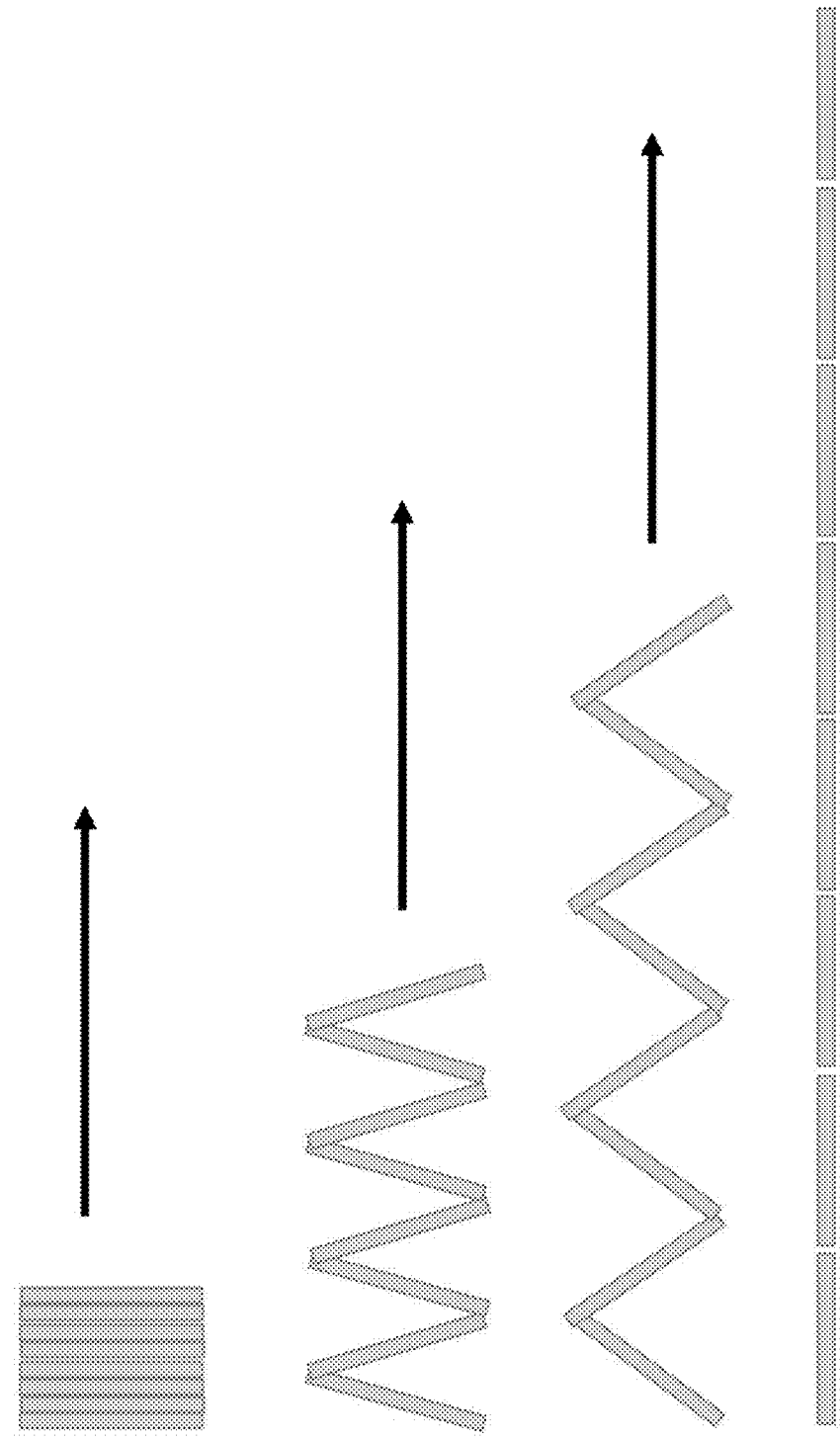

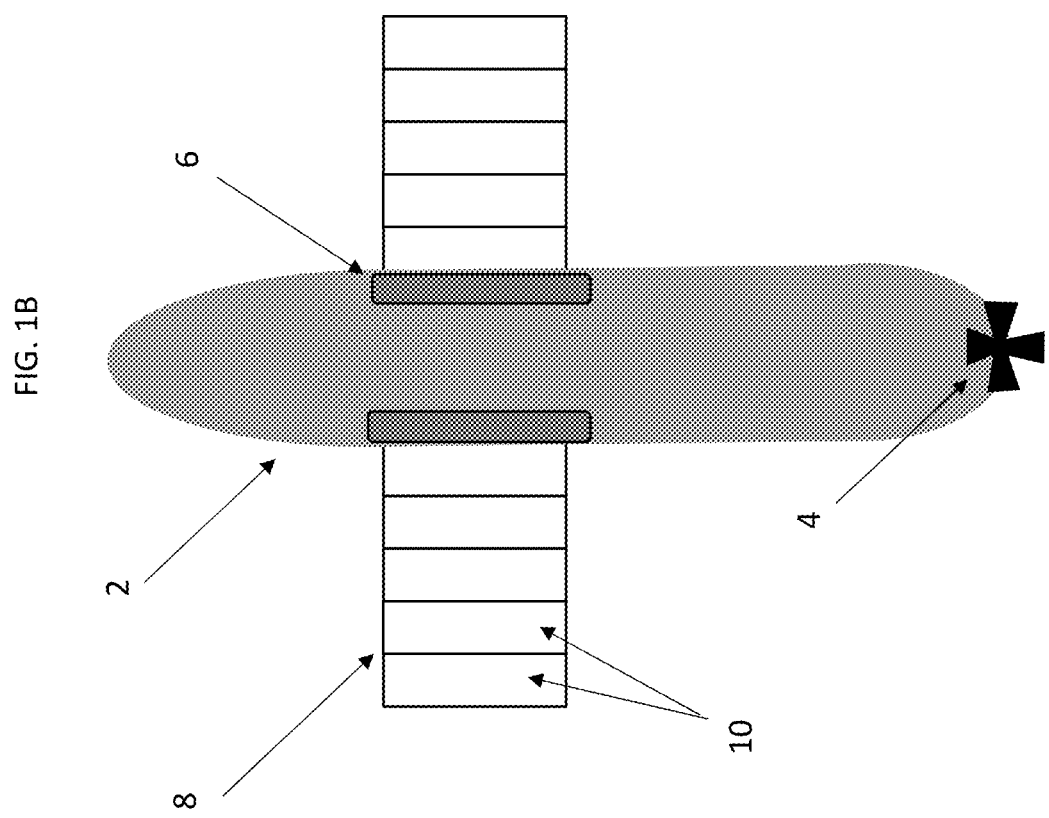

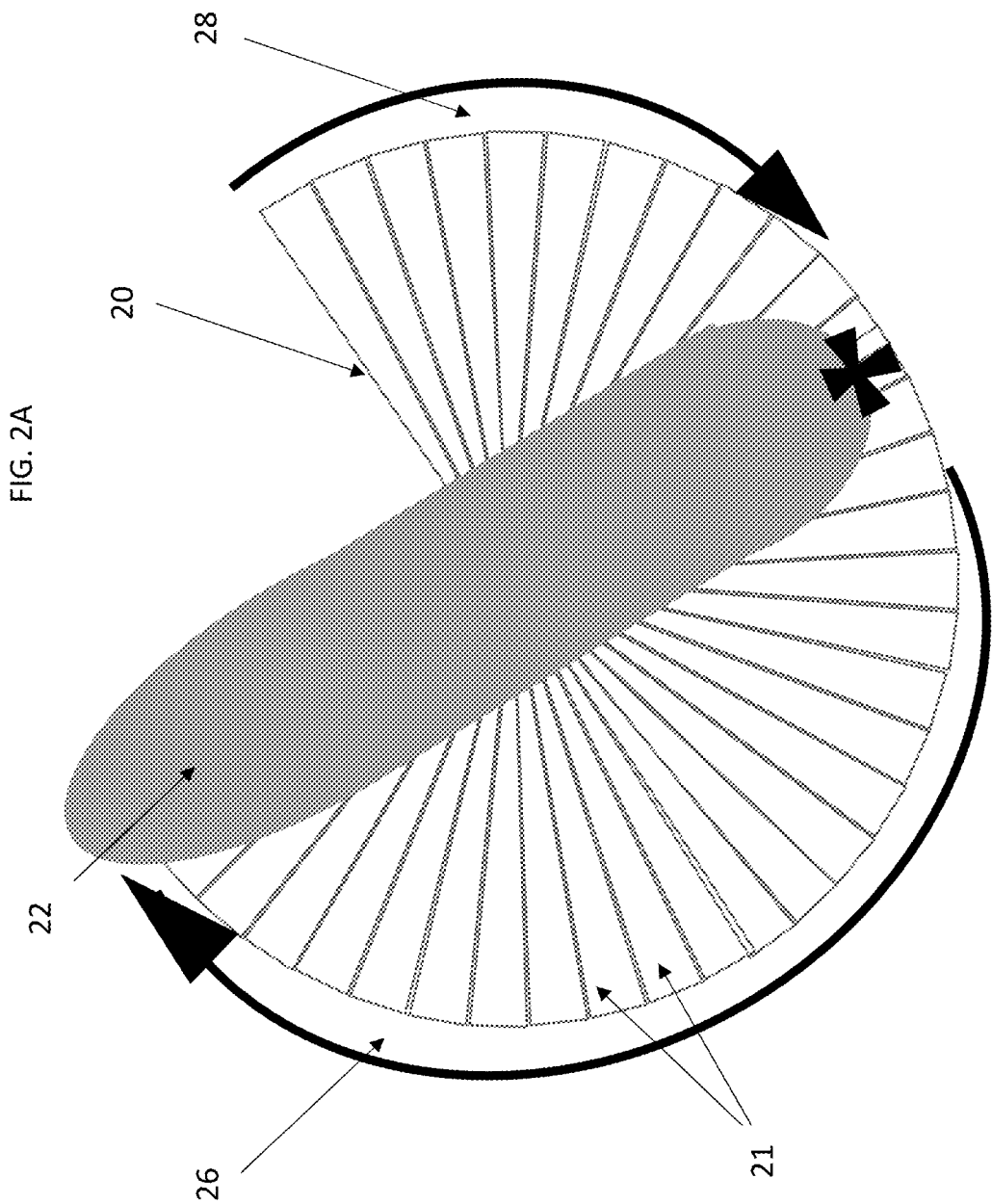

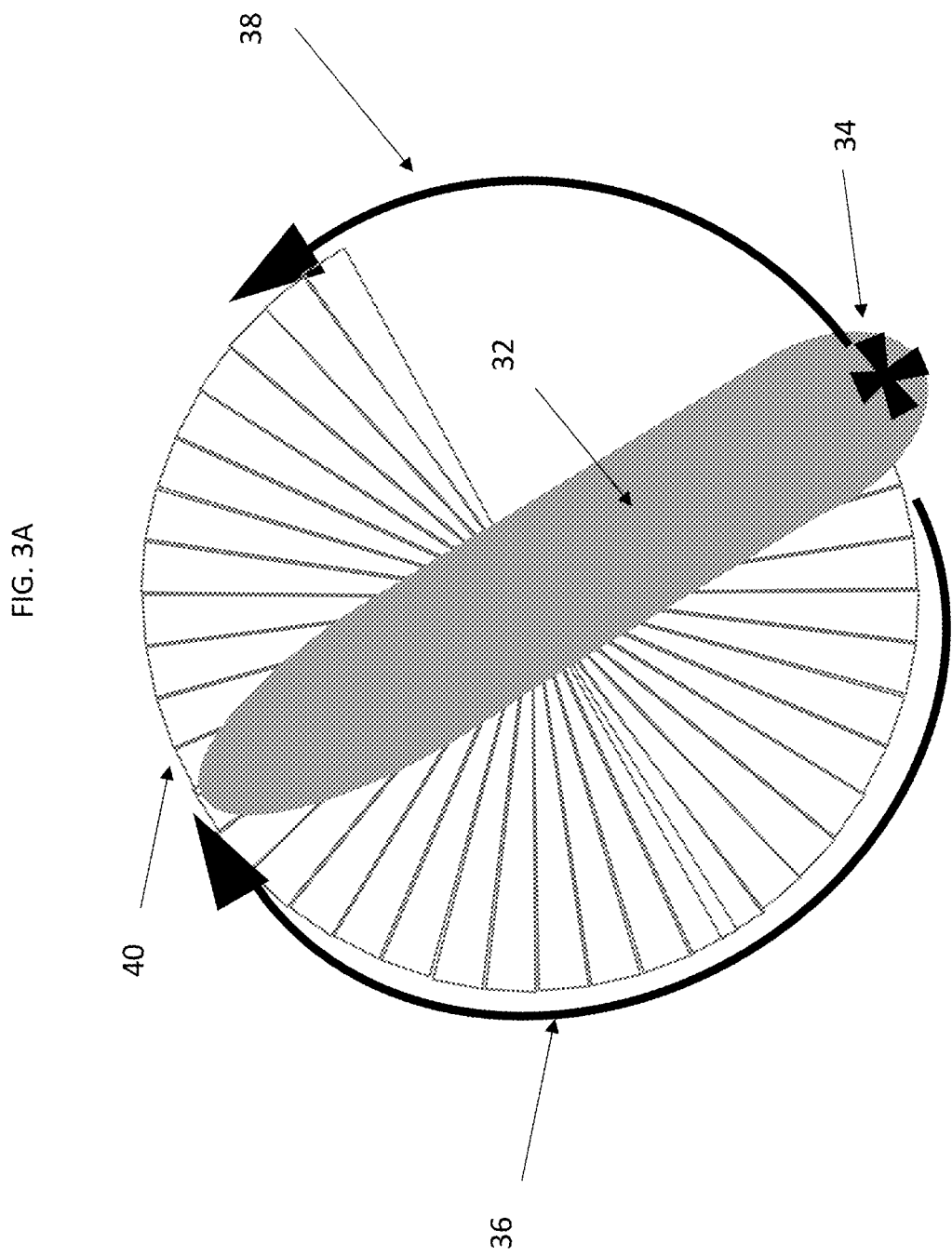

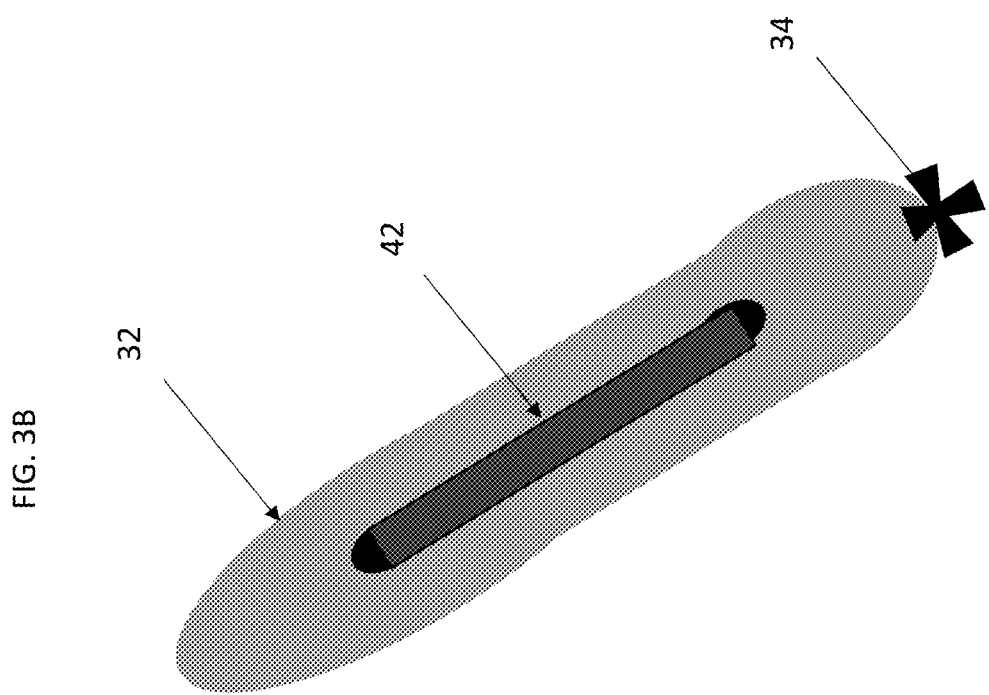

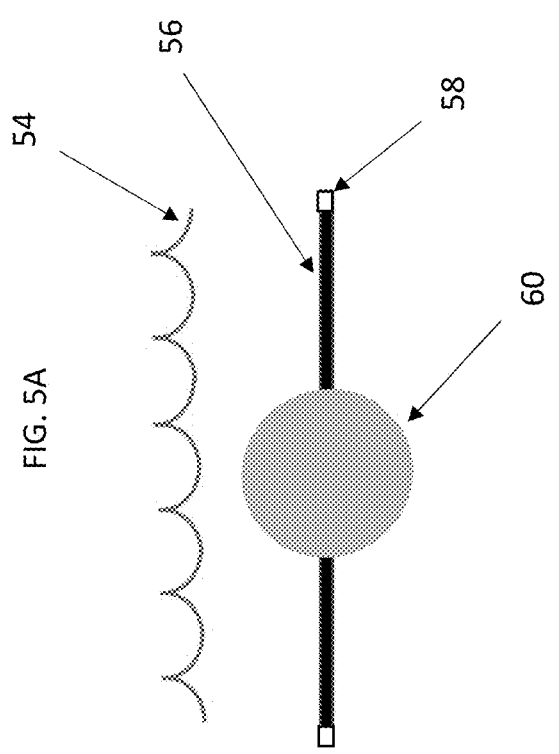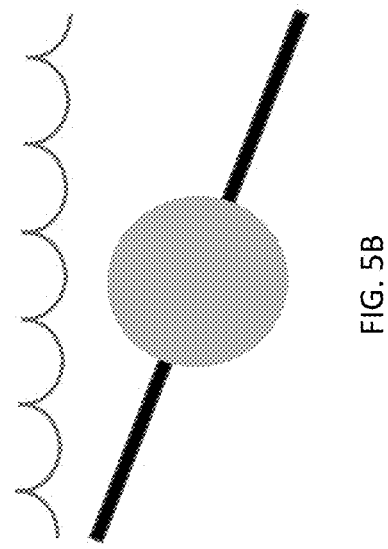

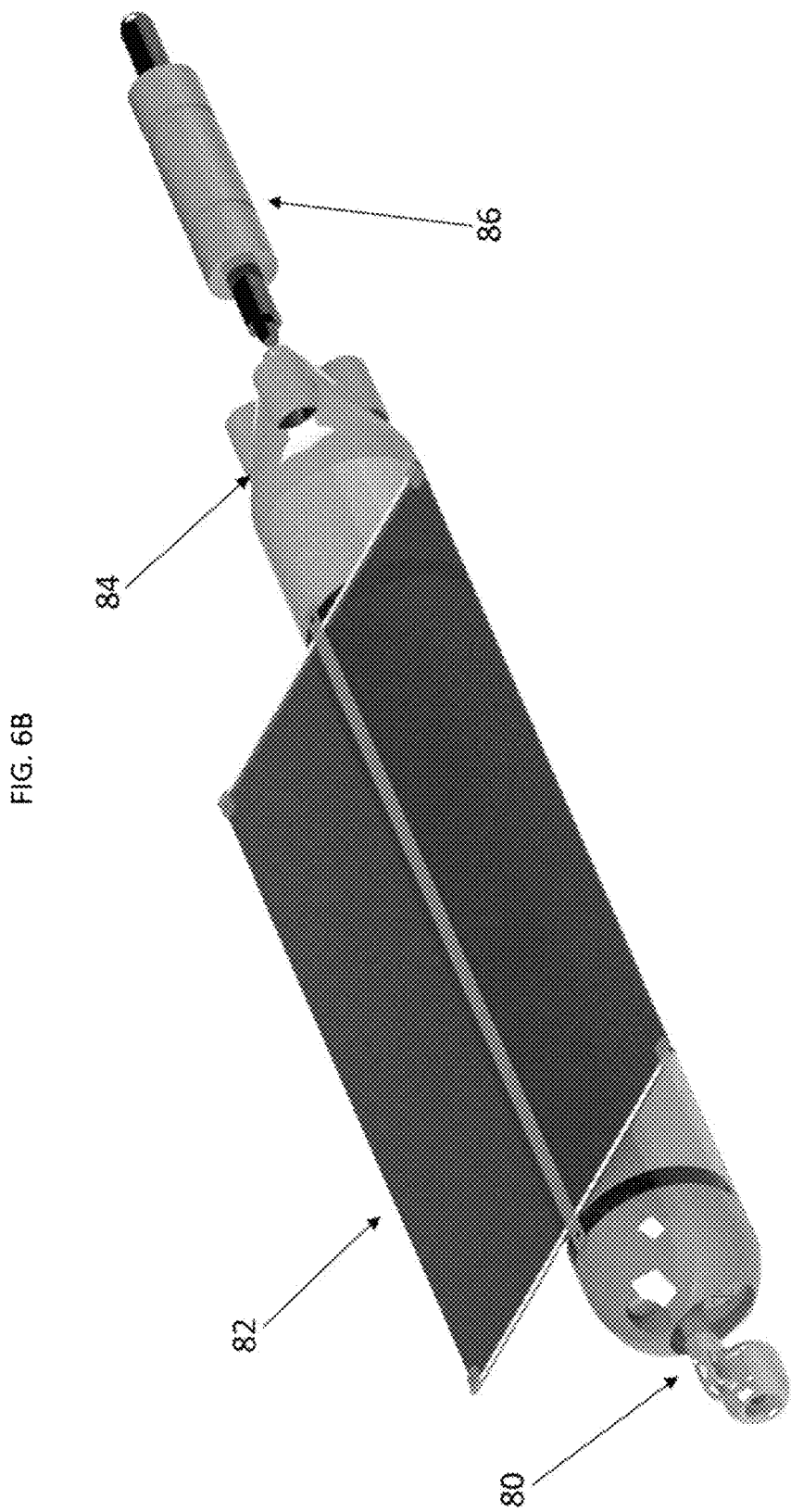

RETRACTABLE SOLAR ARRAYS FOR UNMANNED UNDERWATER VEHICLES

FIELD OF THE DISCLOSURE

The present disclosure relates to solar powered underwater vehicles and more particularly to retractable solar arrays for use on the underwater vehicles.

BACKGROUND OF THE DISCLOSURE

Unmanned Underwater Vehicles (UUVs) are typically battery powered, and due to a limited power supply, their endurance can be an issue. Endurance is especially an issue with smaller UUVs where battery space is limited. It is important to extend the mission time of UUVs and AUVs. One way to increase endurance, and thus mission time, is to attach solar panels to the vehicle to charge the battery on the vehicle and provide power. The vehicle can be proximate the surface such as at the surface or lie within several meters of the surface of the water and recharge its batteries. Once the batteries are recharged, UUV operations can continue. Conventional UUV charging has been accomplished using buoys or charging stations.

Wherefore it is an object of the present disclosure to overcome the above-mentioned shortcomings and drawbacks.

SUMMARY OF THE DISCLOSURE

One aspect of the present disclosure is a solar array for an underwater vehicle, comprising: a plurality of interconnected solar panels configured to form a solar array when deployed: at least one compartment on the underwater vehicle for stowing the plurality of interconnected solar panels when retracted; and at least one battery in an interior of the underwater vehicle wherein the battery is electrically coupled to the solar panels, wherein when the solar array is deployed, the solar array charges the battery on board the underwater vehicle when the underwater vehicle is proximate a surface of a body of water.

One embodiment of the solar array further comprises an electrical feedthrough connection between the compartment and an interior of the underwater vehicle.

Another embodiment of the solar array further comprises electronics in the interior of the underwater vehicle and configured to electrically couple the solar panels to the battery for charging the battery. In certain embodiments, the plurality of interconnected solar panels deploys in an accordion-like manner to form the solar array.

Yet another embodiment of the solar array is wherein there are two solar arrays formed on either side of the underwater vehicle.

Still yet another embodiment of the solar array is wherein the plurality of interconnected solar panels deploys in a fan-like manner to form the solar array. In some embodiments, the deployed solar array covers between 0 and 360 degrees around the underwater vehicle.

Certain embodiments if the solar array further comprise at least one brush disposed on a surface of one or more of the solar panels configured to clean adjacent solar panels.

Still another embodiment of the solar array is wherein an outermost solar panel comprises a buoyant material affixed to the outermost solar panel. In some cases, the solar array is a flexible member housed in the compartment on a cylinder.

Certain embodiments of the solar array further comprise a depth sensor wherein the solar array deploys once a predetermined depth has been detected. In some cases, the predetermined depth is 1-10 meters below the surface of the water.

Some embodiments of the solar array further comprise one or more rods coupled to an edge of the solar panels, wherein the rods engage a rack and pinion system that is coupled to a motor that is used to extend and retract the solar panels.

Another aspect of the present disclosure is an underwater vehicle, comprising: a solar array mechanically coupled to an exterior of the underwater vehicle, the solar array comprising at least one solar panel, the solar panel having a frame on at least three sides of the panel; at least one sensor configured to determine a depth of the underwater vehicle; an electronics charging section housed in an interior of the underwater vehicle; at least one battery housed in an interior of the underwater vehicle, wherein the electronics charging section is electrically coupled to the at least one battery; and a bulkhead connector allowing for electrical coupling between the solar array and the charging electronics, wherein the solar array starts charging the battery through the electronics charging section when the underwater vehicle reaches a predetermined depth below a surface of the water.

One embodiment of the solar array is wherein the solar array is mechanically coupled to the exterior of the underwater vehicle by a breakaway connector. In some cases, the predetermined depth is 1-10 meters below the surface of the water.

Another embodiment of the solar array, further comprises buoyant material affixed to an outermost edge of the frame of the solar panel.

Yet another aspect of the present disclosure is a method of charging at least one battery on an underwater vehicle, comprising: monitoring a charge level of the battery; indicating charging is required when the charge level falls below a lower threshold; detecting a depth of the underwater vehicle; deploying a solar array when the depth reaches a predetermined depth; extending the solar array; and charging the battery.

One embodiment of the method further comprises retracting the solar array when the battery is charged.

Another embodiment of the method further comprises determining a daylight time and only deploying the solar array during the daylight time.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 1A is a diagrammatic view of a retractable solar array in the process of deploying according to one embodiment of the present disclosure.

FIG. 1B is a diagrammatic view of one embodiment of an underwater vehicle having retractable solar arrays as shown in FIG. 1A.

FIG. 2A is a diagrammatic view of a retractable solar array in the process of deploying according to another embodiment of the present disclosure.

FIG. 3A is a diagrammatic view of a retractable solar array in the process of deploying according to yet another embodiment of the present disclosure.

FIG. 3B is a diagrammatic view of one embodiment of an underwater vehicle having stowed retractable solar arrays as shown in FIG. 3A.

FIG. 5A is a cross-sectional view of one embodiment of an underwater vehicle having retractable solar arrays with buoyancy and position stabilization according to the principles of the present disclosure.

FIG. 5B is a cross-sectional view of one embodiment of an underwater vehicle having retractable solar arrays without buoyancy and position stabilization.

FIG. 6B is a front perspective view of one embodiment of an underwater vehicle having deployed retractable solar arrays.

DETAILED DESCRIPTION OF THE DISCLOSURE

Figure 2B:
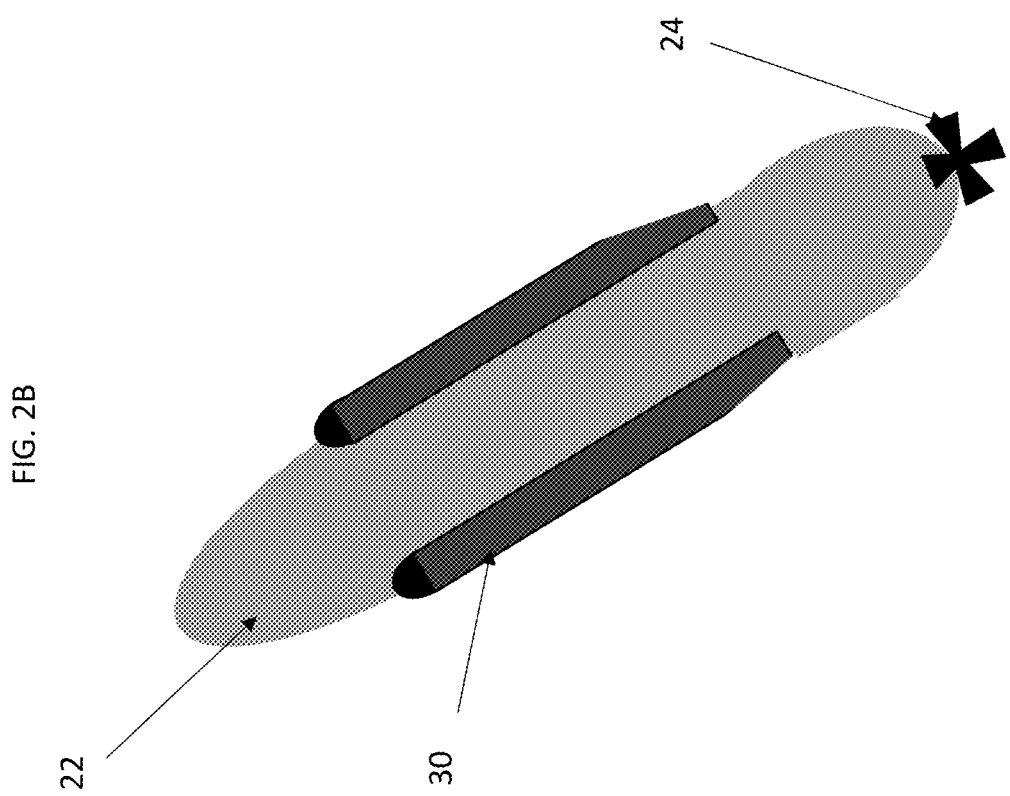
FIG. 2B is a diagrammatic view of one embodiment of an underwater vehicle having stowed retractable solar arrays as shown in FIG. 2A.

It has been recognized that it is important to extend mission time for unmanned underwater vehicles (UUVs) that includes UUVs that are remotely controlled as well as autonomous underwater vehicles (AUVs) that contain processor(s) and electronics to allow for the AUV to operate without continual remote instruction. It is beneficial for the solar panels to provide solar power to the vehicle without adding increased drag. In one embodiment of the present disclosure, solar panels are conformally applied to the body of the UUV or inside a transparent body section of the UUV. This provides for low drag. In such a case, the size of the array would be limited to the size of the UUV, thus having limited power and longer charge times than if a larger solar charging array could be used.

In another embodiment, foldable arrays can be deployed when charging and retracted to resume operations. This approach provides for low drag and can be larger in order to provide for a decreased charge time. However, foldable arrays have increased mechanical complexity. Yet another embodiment of the present disclosure is a retractable array (e.g., fan or the like) that allows the vehicle to deploy a large array for charging and stow the array in an aerodynamically efficient manner during operations. The lower drag leads to longer operational times and the faster recharge times leads to longer operational times. A larger array allows for a reasonable recharge time even at a slight depth (not surfacing) which provides the ability to loiter beneath the surface to increase operational covertness. Still yet another embodiment of the present disclosure is a flexible solar panel that is rolled around a cylindrical vehicle.

The size of the deployable array may be up to as long as the body of the UUV, but could be shorter, depending upon the size, weight and power requirements of the vehicle and mission. A trade between the size and weight of the array itself and the decreased charge time may be conducted to provide an optimized configuration of array size. A larger array will mean a shorter charge time, but will also increase the size and drag of the vehicle. The optimal configuration and array dimensions may be different for each UUV, and may also differ for a single UUV across different mission sets. It is therefore advantageous if the deployable array design is modular, or expandable such that a multitude of different array configurations could be attached to the same UUV depending upon specific mission requirements.

Referring to FIG. 1A, a diagrammatic view of a retractable solar array in the process of deploying according to one embodiment of the present disclosure is shown. More specifically, in one embodiment of a retractable solar array, deployment is from fully folded panels to full extended panels. The solar array panels start from a fully retracted or stowed in an accordion type packing arrangement and extends until the solar array panels are approximately linear. It is to be understood that there may be other ways of retracting the array for stowage. The deployment and stowage mechanism may use motors, pneumatic, hydraulic means to actuate.

Referring to FIG. 1B, a diagrammatic view of one embodiment of an underwater vehicle having deployed retractable solar arrays as shown in FIG. 1A is shown. More specifically, one embodiment of an underwater vehicle 2 has a propeller 4 and has compartments 6 where the retractable solar array(s) is deployed from and stowed within. The retractable arrays 8 are made up of multiple interconnected solar panels 10 that upon deployment create the solar array. The solar array may consist of individual components attached with joints having flexibly hinged sections, or may be a single flexible panel, or a series of flexible panels.

In one example, the compartments 6 are mounted to an exterior of the underwater vehicle 2 such as by welding and/or mounting hardware. In this example there are two compartments 6 on either side of the UUV. There is an electrical feedthrough or bulkhead connection between the compartment and an interior of the UUV. The compartments can be water flooded and employ a pitot tube to measure depth and trigger the mechanism to deploy the solar array. Other sensors can be employed such as pressure sensors to determine depth and radiation sensors to detect daylight and solar radiation. In one example, a GPS system is used to keep time and deploy during daylight hours. The radiation sensor can also indicate a depth that is below the surface but allowing sufficient charging that is useful when operating in stealth mode. The UUV may use battery charging electronics to condition the solar power and trickle charge the battery.

In one example the deployment and stowage uses one or more rods that engage a rack and pinion system that is coupled to a motor that is used to extend and retract the solar panels. The rod can be rigid or semi-rigid and be coupled to the side of the solar panels to facilitate the deployment and engagement. In one example the rod is on a single side of the panels and extends for a some length or the entire length of the panels.

Referring to FIG. 2A, a diagrammatic view of a retractable solar array in the process of deploying according to another embodiment of the present disclosure is shown. More specifically, one embodiment of an underwater vehicle 22 has a retractable array 20 that are made up of multiple connected solar panels 21 that upon deployment create the solar array. Here, the deployment direction 26 can include up to 180° and the fan-like array can be retracted along an opposing retraction direction 28.

In one example at least one compartment is on an upper or top portion of the UUV with a latch mechanism to retain the panels in place during stowage. When actuated to deploy, the latch releases and the panels extend from the UUV in a radial pattern. In order to facilitate deployment, the UUV may undergo a turning maneuver to allow the panels to disperse. In one example the panels in the radial pattern are not rectangular but rather have a narrower section on the inner region.

Referring to FIG. 2B, a diagrammatic view of one embodiment of an underwater vehicle having retractable solar arrays as shown in FIG. 2A is depicted. More specifically, one embodiment of an underwater vehicle 22 has a propeller 24 and has two compartments 30 where each retractable solar array may be deployed from and stowed within the compartments.

Referring to FIG. 3A, a diagrammatic view of a retractable solar array in the process of deploying according to yet another embodiment of the present disclosure is shown. More specifically, one embodiment of an underwater vehicle 32 has a propeller 34 and a retractable array 40 that is made up of multiple connected solar panels that upon deployment creates a large solar array. Here, the deployment direction 36 can include up to 360° and the fan-like array can be retracted along an opposing retraction direction 38.

Referring to FIG. 3B, a diagrammatic view of one embodiment of an underwater vehicle having a stowed retractable solar array as shown in FIG. 3A is shown. More specifically, one embodiment of an underwater vehicle 32 has a propeller 34 and a compartment 42 where the retractable solar array may be deployed from and stowed within the compartment.

Another important consideration for UUVs is biofouling. Biofouling is when biological growth or debris accumulates on the UUV during extended operations. Biofouling on the surface of solar panels can lead to reduced efficiency: decreased power generation; longer recharging cycles; and decreased operations. Conformal and interior solar panels are susceptible to biofouling as they are continuously exposed to the environment. Folding or retractable solar panels have the advantage that they are only exposed to the environment during the active charge cycle (deployed) and can be concealed (retracted/stowed) during operations. In one embodiment of the present disclosure, during retraction of the solar arrays additional methods can be employed to mitigate biofouling such as cleaning or sweeping the array with a brush (passive or active). A passive method is when the array is cleaned as it passes by an abrasive mechanism or component(s) during deployment and retraction. The abrasive mechanism(s) may be a brush, sets of brushes, a wiper, or other passive friction based method, or any combination thereof. In an active cleaning method the abrasive mechanisms may be motorized or otherwise actuated to increase surface agitation to more efficiently remove foreign contaminants and biofouling on the array surface.

Figure 4A:
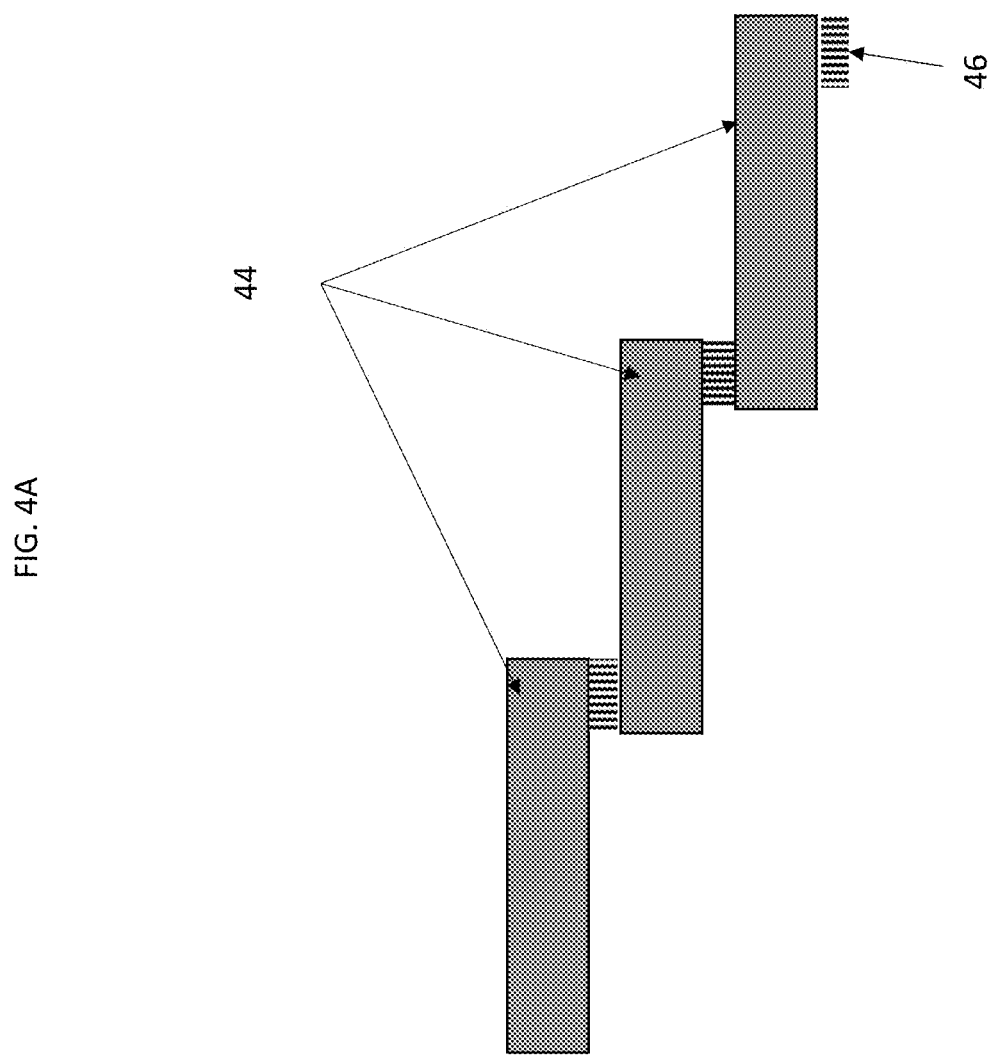
FIG. 4A is a diagrammatic view of one embodiment of anti-biofouling retractable solar arrays in a deployed state according to the principles of the present disclosure.
Figure 4B:
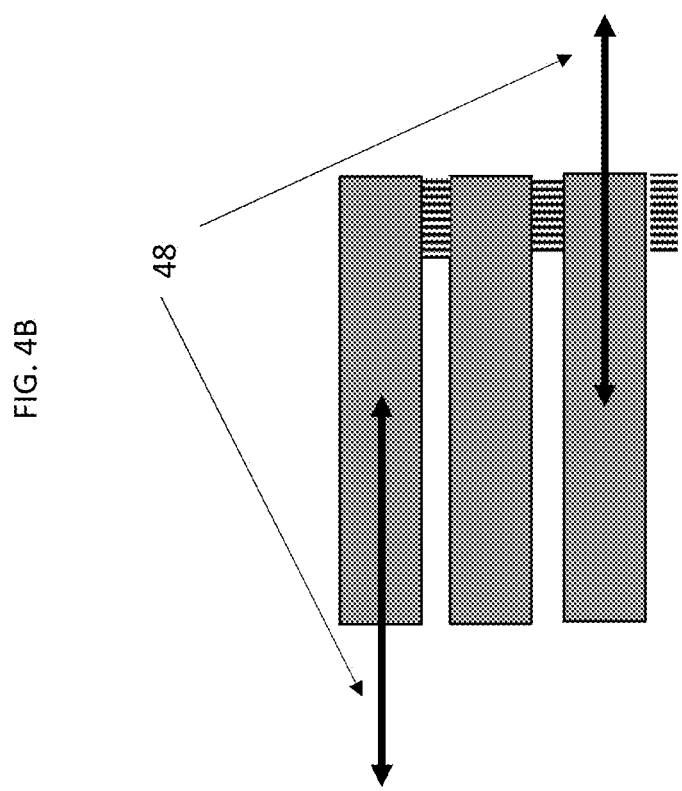
FIG. 4B is a diagrammatic view of one embodiment of anti-biofouling retractable solar arrays in a retracted or stowed state according to the principles of the present disclosure.

Referring to FIG. 4A, a diagrammatic view of one embodiment of anti-biofouling retractable solar array in a deployed state according to the principles of the present disclosure is shown. More specifically, during extension and retraction of the solar arrays a linear brush 46 attached to the underside of an adjacent panel 44 cleans the top surface of a panel section. Referring to FIG. 4B, a diagrammatic view of one embodiment of anti-biofouling retractable solar arrays in the stowed state according to the principles of the present disclosure is shown. More specifically, extension and retraction of the solar array 48 causes the linear brush to clean the top surface of an adjacent panel section.

Figure 4C:
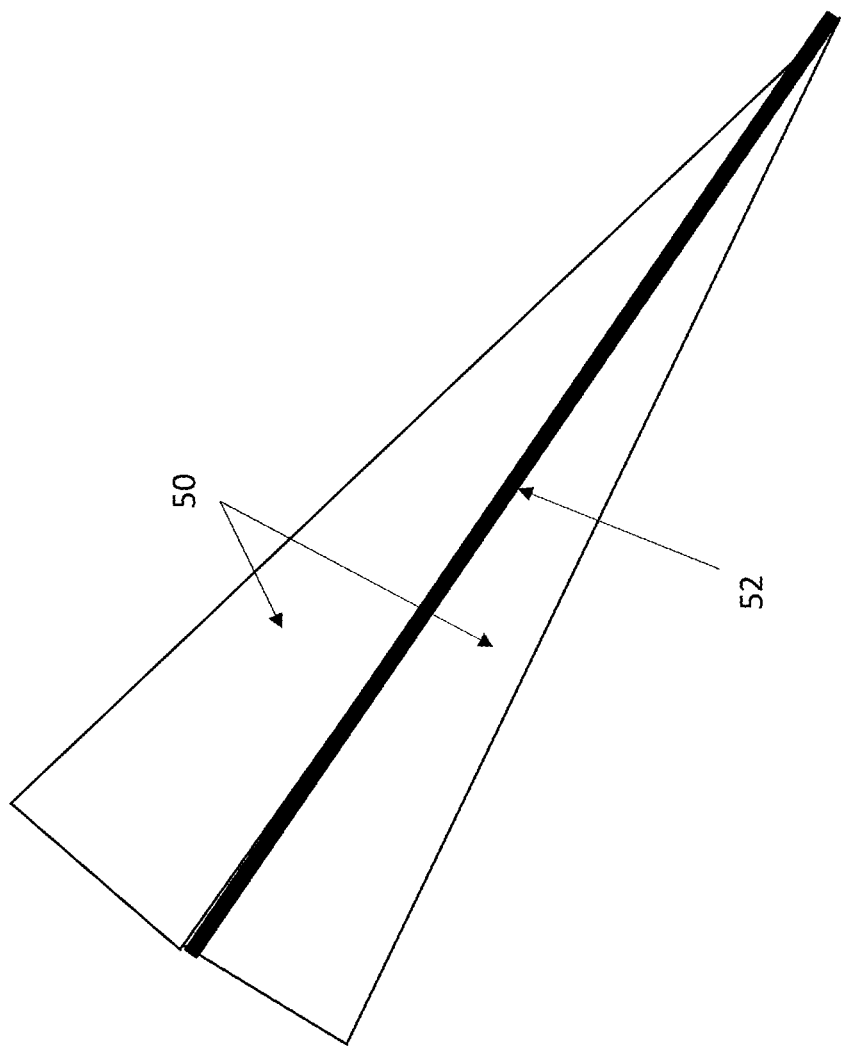
FIG. 4C is a diagrammatic view of another embodiment of anti-biofouling retractable solar arrays in a deployed state according to the principles of the present disclosure.

Referring to FIG. 4C, a diagrammatic view of another embodiment of anti-biofouling retractable solar array in the deployed state according to the principles of the present disclosure is shown. More specifically, during extension and retraction of fan-like solar arrays a linear brush 52 attached to the underside of an adjacent panel 50 cleans the top surface of the next panel section. In certain embodiments, brushes are made of nylon or softer so as not to scratch acrylic or glass layers of a solar panel. In one example the hardness is set to be less than the hardness of the solar panel surface to avoid scratching.

Figure 4D:
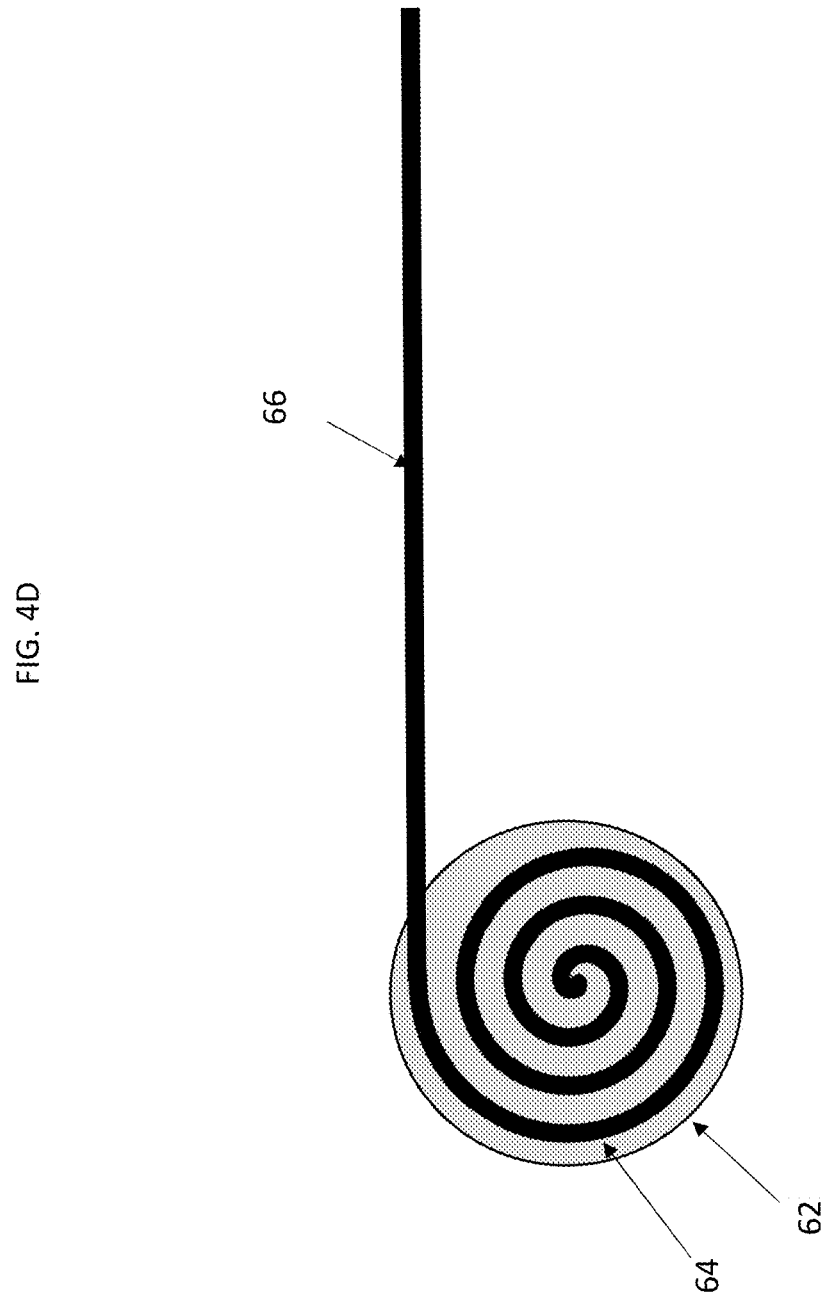
FIG. 4D is a diagrammatic view of another embodiment of a retractable solar array according to the principles of the present disclosure.

FIG. 4D, a diagrammatic view of another embodiment of a retractable solar array according to the principles of the present disclosure is shown. More specifically, one embodiment of the retractable solar array comprises a flexible member with an array of panels. In another embodiment, the flexible member comprises a plurality of jointed panels. In certain embodiments, the flexible member is stored in a compartment of the UUV 62 in a rolled up fashion 64 on a cylinder and can be deployed (unrolled) and retracted (rolled up) according to the principles of the present disclosure. In this figure, the array is partially deployed 66. In one embodiment, the flexible array is a single flexible member having a plurality of panels rolled up on a cylinder in a compartment and a single motor actuates the deployment/stowage of the flexible member similar to how a rollup door works on a garage/shop. In some cases, the panels of the flexible member are distinct solar sections.

Referring to FIG. 5A, a cross-sectional view of one embodiment of an underwater vehicle having retractable solar arrays with buoyancy and position stabilization according to the principles of the present disclosure is shown. More specifically, the underwater vehicle 60 is some distance under the surface of the water 54. The UUV is shown with its solar arrays 56 deployed and having a buoyant material 58 affixed about at least some of the end portion of the outermost panel.

In contrast, and referring to FIG. 5B, a cross-sectional view of one embodiment of an underwater vehicle having retractable solar arrays without buoyancy and position stabilization is shown. More specifically, the UUV has its solar array deployed but is experiencing roll error because there is no buoyant material present on the arrays to help with position stabilization. The buoyancy of the material and the size and shape would need to be optimized to provide the proper vehicle response. The buoyant material may also have a dual purpose where it acts as the sealing surface when retracted. The buoyant material may also have a shape optimized to provide low drag when the array is in the stowed position. In one example the buoyant material acts as an outrigger deployed on the first panel to be extended outwards to limit roll of the UUV.

In certain embodiments, a bistable material is used to achieve the necessary rigidity when an array is fully deployed. In some cases, an underlying floatation form may be used to allow the solar array to spread out at the surface of the water. When deploying large panels, they are susceptible to modifying the weight balance of the vehicle. A large, deployed array can act as a sail and cause an un-intended roll. Optimally, the solar array remains perpendicular to the sun, or perpendicular to the water surface as errors in orientation can degrade solar charging efficiency. The addition of buoyant materials such as foams, plastics, or other materials having a density lower than the operating environmental fluid of the UUV (typically fresh water or salt-water <1 $g/cm^2$) help to keep the vehicle in a proper orientation when the panel is in a deployed state.

In certain embodiments, buoyant material could be attached to the edge of the panels or integrated into the array elsewhere. In some cases, optimal charging of solar cells is accomplished by surfacing completely and exposing the cells to the full power of the sun. However, surfacing to recharge can expose the UUV to a multitude of potential problems, such as being hit by a boat, being damaged by waves and surface debris, being stolen, or revealing itself during a covert mission.

For the security of the vehicle and the mission, it may be desirable for the UUV to remain below the surface during the recharge cycle. In some cases, a depth of 1-10 meters below the surface is used. In certain embodiments depths of 100 m or less are used. When at some depth, larger solar cells are needed to compensate for decreased solar irradiance. A large deployable array helps to offset the decreased solar flux when charging at some depth. When charging at some depth, sea water absorbs red light, and is more transparent to blue and green light (400-500 nm). In certain embodiments, the solar cells are doped with (or constructed with) materials that make them more efficient at shorter wavelengths, where water transmission is highest. In certain embodiments, once the arrays are deployed the arrays only begin to collect and store energy once a certain threshold of detected radiation is met.

Figure 6A:
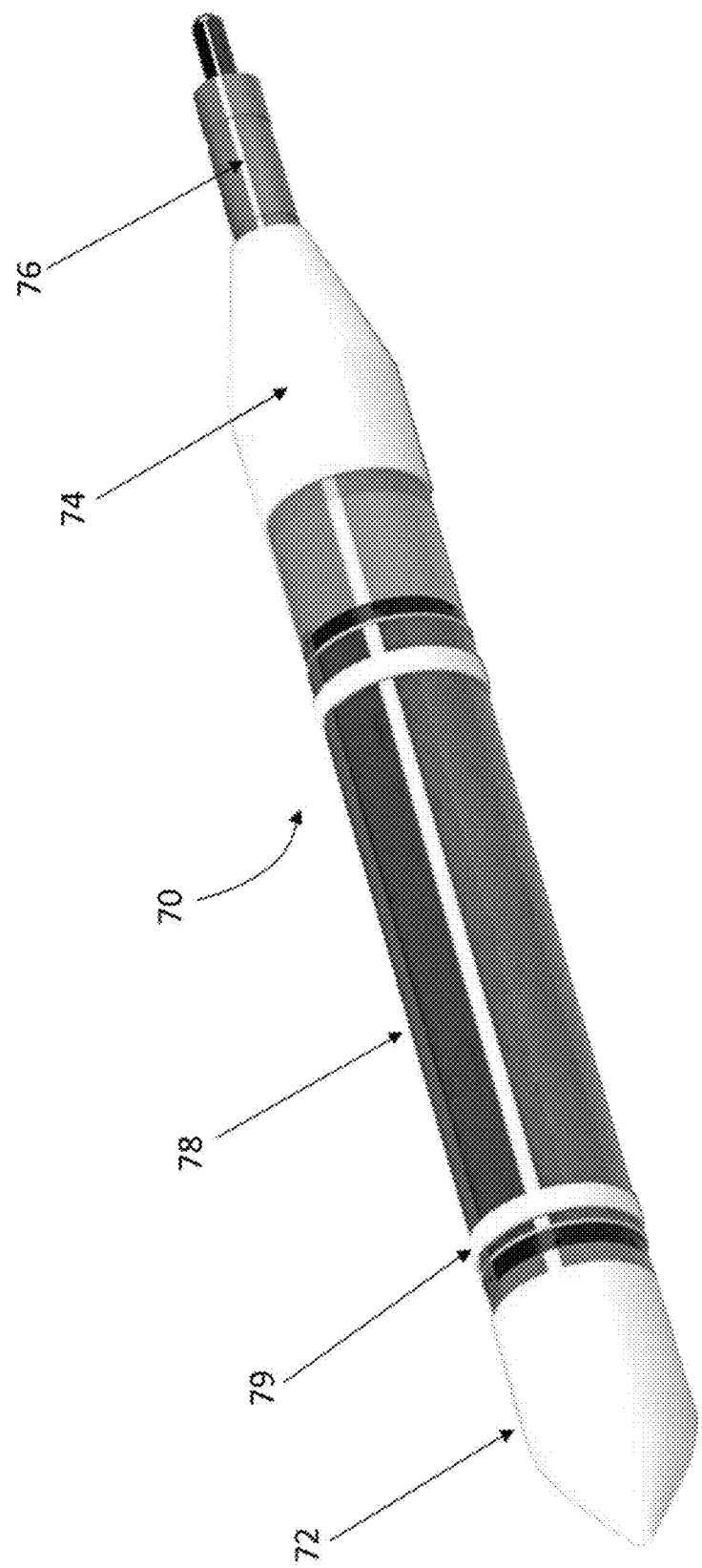
FIG. 6A is another embodiment of an underwater vehicle having deployable solar arrays according to the principles of the present disclosure.

Referring to FIG. 6A, a diagrammatic view of one embodiment of an underwater vehicle having deployable solar arrays is shown. More specifically, one embodiment of an underwater vehicle 70 has a propeller shaft 76 on the rear portion 74, opposite the nose portion 72 and a flexible solar array 78 which is stowed by being wrapped around the vehicle 70 until deployed. The solar arrays can either be deployed mechanically or using a water-soluble band 79, where upon entering the water, the band 79 dissolves, allowing the solar arrays to spring outward. This would enable the UUV to be deployed having a smooth surface for airborne drops. The width of the solar panel would be approximately equal to the circumference of the UUV. Once deployed the panels would remain in place on the outer surface of the UUV. In one embodiment the solar panel is affixed with a breakaway connector that would allow the panel to detach in the event there was excessive pressure that might harm the UUV. A bulkhead connector allows for electrical connections between the solar panels and an electrical charging circuit in the interior of the UUV that is further coupled to the battery.

Referring to FIG. 6B, a front perspective view of one embodiment of an underwater vehicle having deployed solar arrays 82. More specifically, the array 82 is shown on the underwater vehicle, which has a leading end 80, where sensors may be present, and a tailing end 84 where a propeller shaft 86 may be present. The panels of the solar array 82 in one example are semi-rigid panels having an outer extrusion frame such as aluminum. The panels 82 in one example are affixed to the outer housing of the UUV with a break away connector to allow for the panels to break loose in the event of excessive pressure or forces that might damage the UUV.

Figure 6C:
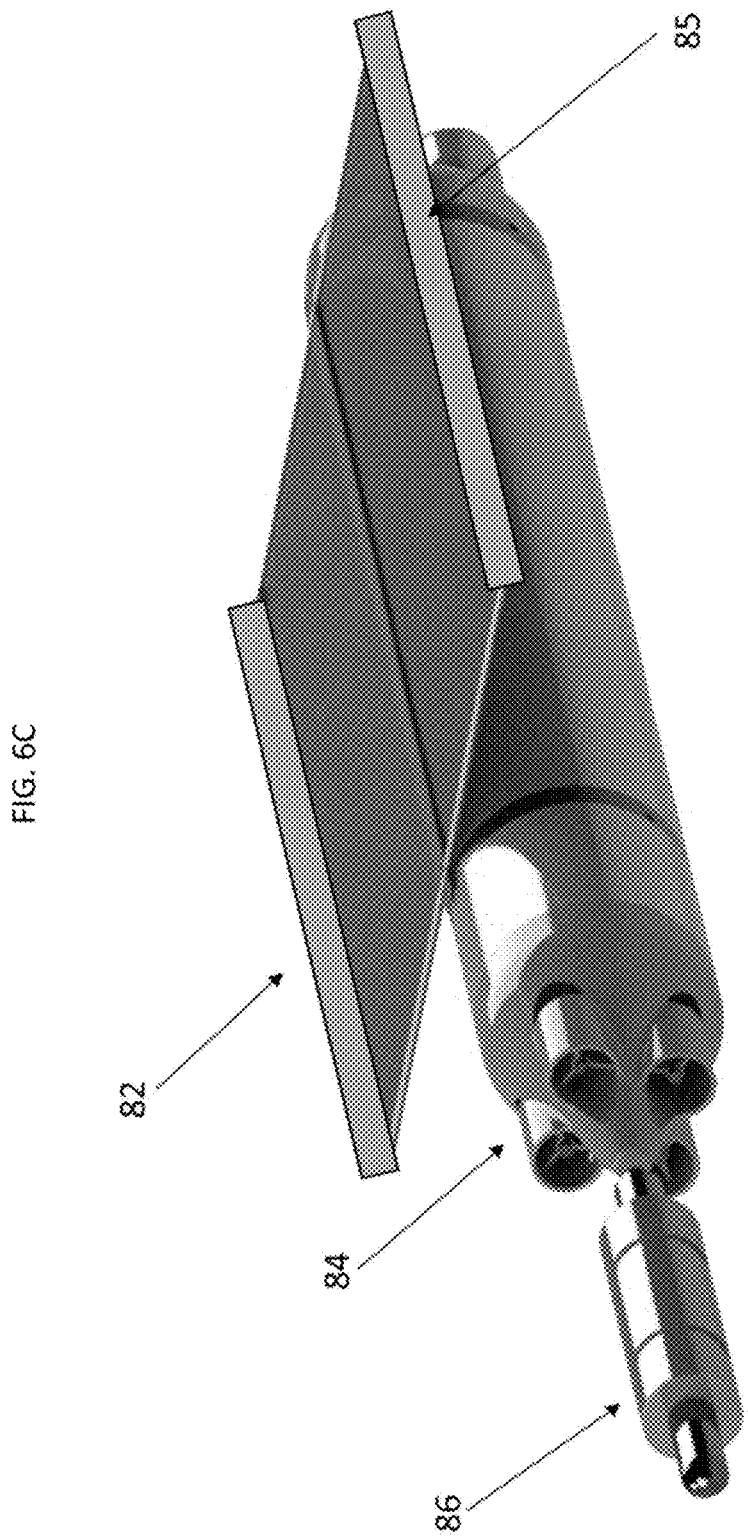
FIG. 6C is a rear perspective view of one embodiment of an underwater vehicle having deployed retractable solar arrays as shown in FIG. 6B.

Referring to FIG. 6C, a rear perspective view of one embodiment of an underwater vehicle having the solar array 82 as shown in FIG. 6B is shown. More specifically, the array 82 is shown on an underwater vehicle, which has tailing end 84 where a propeller shaft 86 may be present. In one example, buoyant material 85 is affixed to the outermost edges of the solar array panels for stability.

Figure 6D:
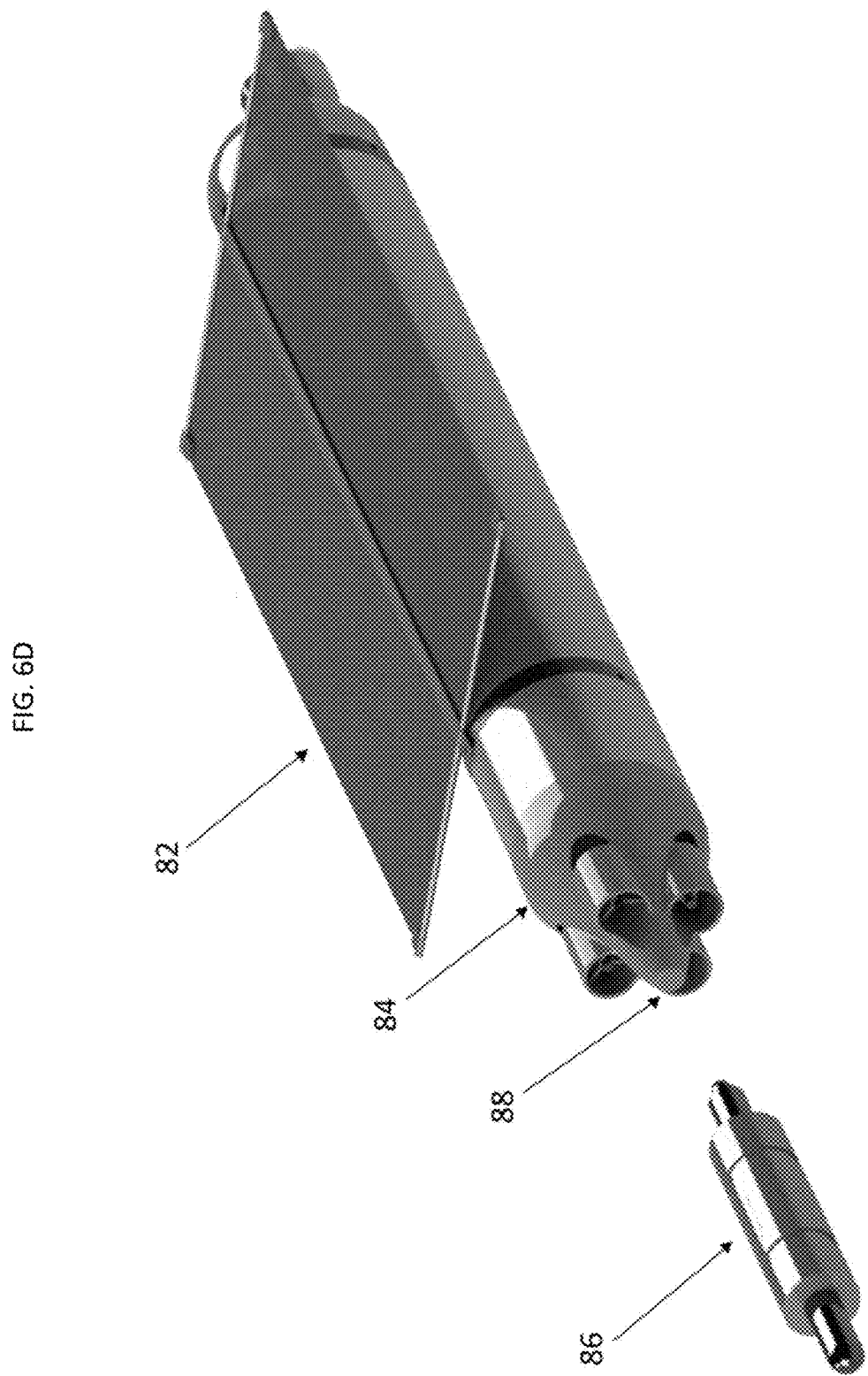
FIG. 6D is another rear perspective view of one embodiment of an underwater vehicle having deployed retractable solar arrays as shown in FIG. 6B.

Referring to FIG. 6D, another rear perspective view of one embodiment of an underwater vehicle having deployed solar arrays as shown in FIG. 6B is shown. More specifically, the array 82 is shown on an underwater vehicle, which has a tailing end 84 where a propeller shaft 86 may be present. Additional components such as the propeller are not shown for simplicity, and they are not required to describe the function of the invention described herein.

Figure 6E:
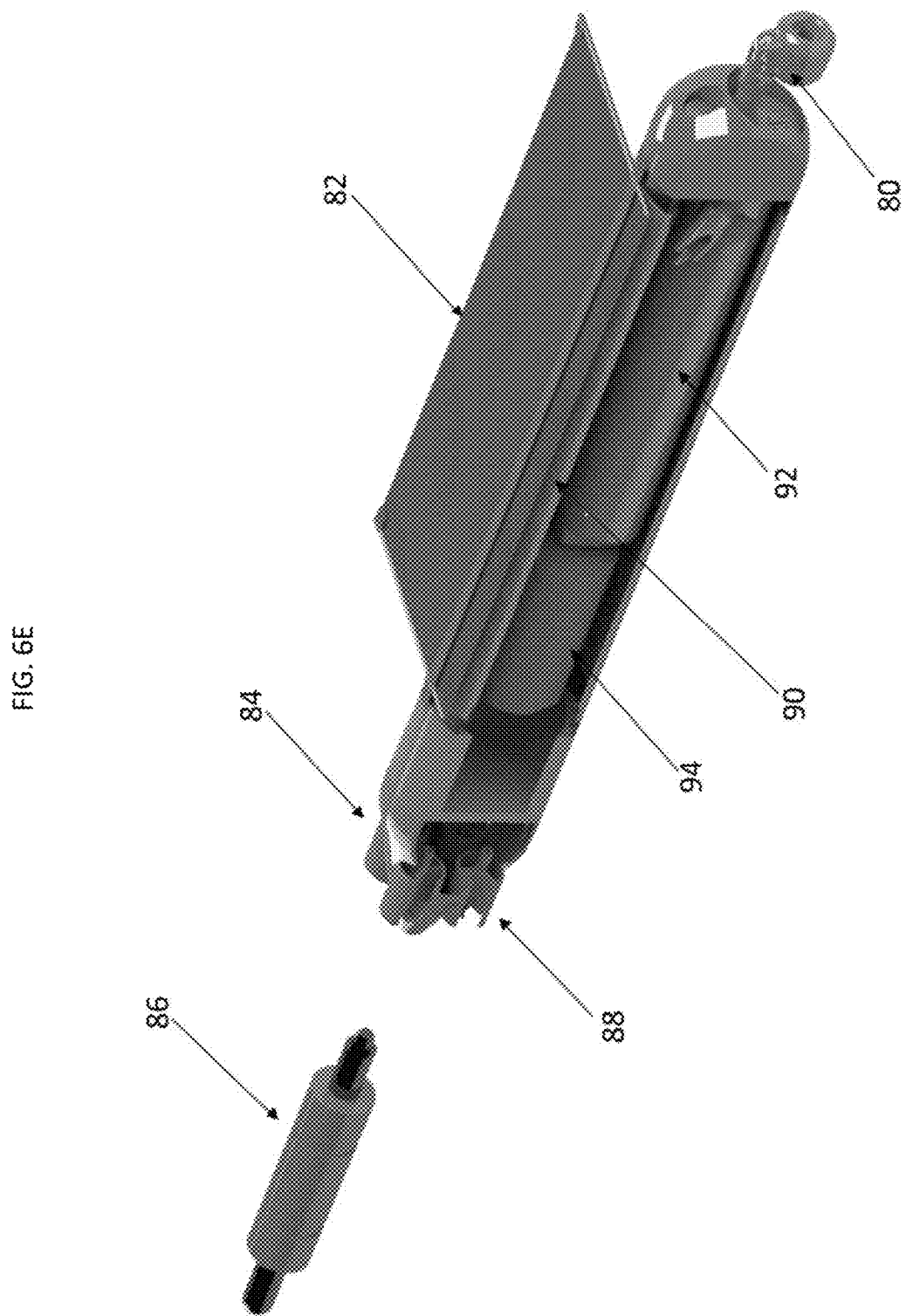
FIG. 6E is a cross-sectional front perspective view of one embodiment of an underwater vehicle having deployed retractable solar arrays as shown in FIG. 6B.

Referring to FIG. 6E, an exploded cross-sectional view of one embodiment of an underwater vehicle having the solar arrays as shown in FIG. 6B is shown. More specifically, a deployed array 82 is shown on an underwater vehicle, which has a leading end 80, where sensors may be present, and a tailing end 84 where a propeller shaft 86 may be present. Additional motors or steering devices 88 may also be used. The interior section 94 in one example contain a battery or multiple batteries arranged into a battery pack assembly. The interior section 94 may also contain charging circuits to manage the recharge cycle of the array, and sensors to monitor battery charge level. The interior 94 may also contain system control circuits to manage the charging cycle and initiate the deployment and stowing cycles associated with recharging. The UUV would also contain payload 92 which would be mission configurable.

Figure 7A:
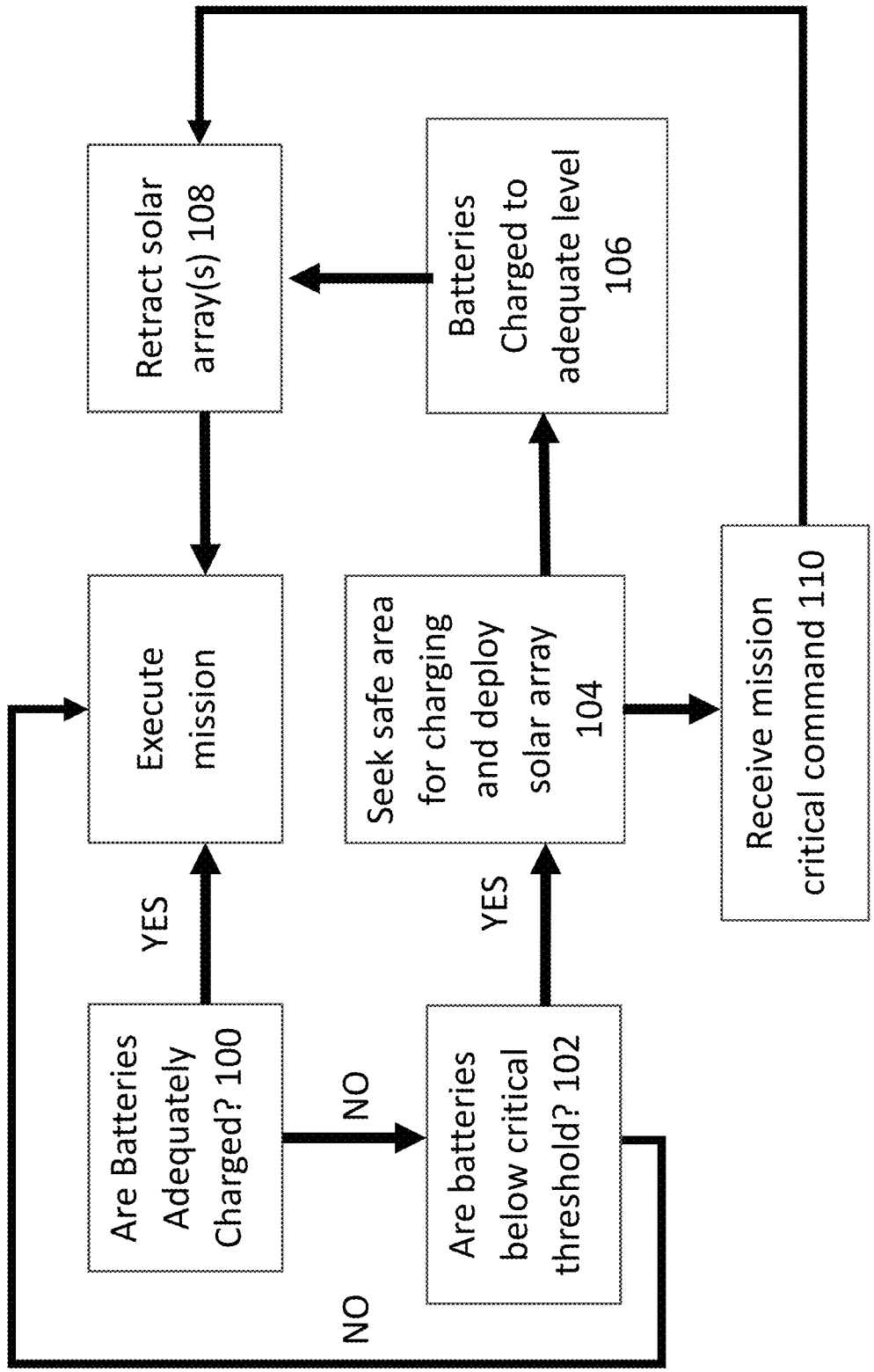
FIG. 7A is a flowchart of one embodiment of method of deploying retractable solar arrays for an underwater vehicle.

Referring to FIG. 7A, a flowchart of one embodiment of method of deploying retractable solar arrays for an underwater vehicle is shown. More specifically, deployment of the solar charging array may be initiated by the UUV control system when the UUV detects that the battery is low 100 and below a lower threshold. When initiating a charge command, because the batteries are below a threshold 102, the central control system will determine if the vehicle is in a safe location to deploy 104. If not, it may navigate to a safe location before initiating deployment. The vehicle may use external sensors such as GPS or depth gauges to determine the proper depth of the vehicle during deployment. The depth of deployment may be programmable, and may be dependent upon vehicle location or specific mission set. When the system has detected that the batteries are charged to an adequate level 106, the UUV control system would then initiate a retract command 108, and the array would go into a stowed position. The level of charging can be used to determine weather conditions and low charging levels would be indicative of clouds or rain. Similarly, a timer such as in the GPS is used to enable detection of daylight time and deploying the solar array during the daylight time. The UUV may also accept commands from outside the vehicle to initiate a charge or stow cycle 110. In certain embodiments, the charging cycle may be interrupted by the control system, if needed.

Figure 7B:
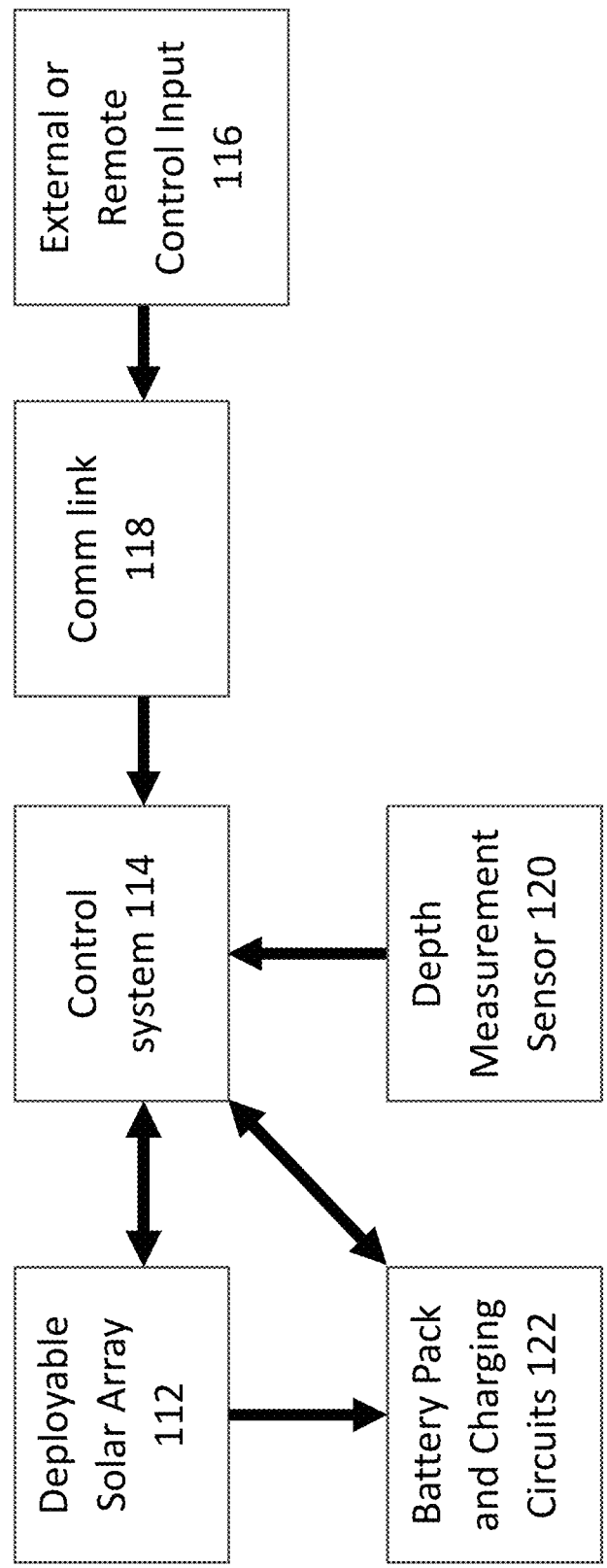
FIG. 7B is a system flowchart of one embodiment of a retractable solar arrays for an underwater vehicle.

Referring to FIG. 7B, a system flowchart of one embodiment of a retractable solar array is shown. More specifically, one embodiment of a deployable solar array 112 may receive instructions to deploy/retract from a control system 114 or an external or remote control input 116 via a communication link 118. In certain embodiments, the vehicle may use external sensors such as GPS or depth gauges to determine the proper depth of the vehicle during deployment 120. The depth of deployment may be programmable, and may be dependent upon vehicle location or specific mission set. Additionally, the system comprises a battery pack and charging circuits 122. Non-participating features such as the payload, motors, and other components not related specifically to this disclosure are omitted from this diagram for simplicity.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto. Components not critical to the description of the invention may be omitted.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A solar array for an underwater vehicle, comprising:
   a plurality of interconnected solar panels configured to form a solar array when deployed;
   at least one compartment on the underwater vehicle for stowing the plurality of interconnected solar panels when retracted; and
   at least one battery in an interior of the underwater vehicle wherein the battery is electrically coupled to the solar panels,
   wherein when the solar array is deployed, the solar array charges the battery on board the underwater vehicle when the underwater vehicle reaches a predetermined depth below the surface of a body of water.

2. The solar array according to claim 1, further comprising an electrical feedthrough connection between the compartment and an interior of the underwater vehicle.

3. The solar array according to claim 2, further comprising electronics in the interior of the underwater vehicle and configured to electrically couple the solar panels to the battery for charging the battery.

4. The solar array according to claim 1, wherein the plurality of interconnected solar panels deploys in an accordion-like manner to form the solar array.

5. The solar array according to claim 1, wherein there are two solar arrays formed on either side of the underwater vehicle.

6. The solar array according to claim 1, wherein the plurality of interconnected solar panels deploys in a fan-like manner to form the solar array.

7. The solar array according to claim 1, wherein the deployed solar array covers between 0 and 360 degrees around the underwater vehicle.

8. The solar array according to claim 1, further comprising at least one brush disposed on a surface of one or more of the solar panels configured to clean adjacent solar panels.

9. The solar array according to claim 1, wherein an outermost solar panel comprises a buoyant material affixed to the outermost solar panel.

10. The solar array according to claim 1, wherein the solar array is a flexible member housed in the compartment on a cylinder.

11. The solar array according to claim 1, further comprising a depth sensor wherein the solar array deploys once a predetermined depth has been detected.

12. The solar array according to claim 11, wherein the predetermined depth is 1-10 meters below the surface of the water.

13. The solar array according to claim 11, further comprising one or more rods coupled to an edge of the solar panels, wherein the rods engage a rack and pinion system that is coupled to a motor that is used to extend and retract the solar panels.

14. An underwater vehicle, comprising:
   a solar array mechanically coupled to an exterior of the underwater vehicle, the solar array comprising at least one solar panel, the solar panel having a frame on at least three sides of the panel;
   at least one sensor configured to determine a depth of the underwater vehicle;
   an electronics charging section housed in an interior of the underwater vehicle;
   at least one battery housed in an interior of the underwater vehicle, wherein the electronics charging section is electrically coupled to the at least one battery; and
   a bulkhead connector allowing for electrical coupling between the solar array and the charging electronics, wherein the solar array starts charging the battery through the electronics charging section when the underwater vehicle reaches a predetermined depth below a surface of the water.

15. The solar array according to claim 14, wherein the solar array is mechanically coupled to the exterior of the underwater vehicle by a breakaway connector.

16. The solar array according to claim 14, wherein the predetermined depth is 1-10 meters below the surface of the water.

17. The solar array according to claim 14, further comprising buoyant material affixed to an outermost edge of the frame of the solar panel.

18. A method of charging at least one battery on an underwater vehicle, comprising:
   monitoring a charge level of the battery;
   indicating charging is required when the charge level falls below a lower threshold;
   detecting a depth of the underwater vehicle;
   deploying a solar array when the depth reaches a predetermined depth;
   extending the solar array; and
   charging the battery.

19. The method according to claim 18, further comprising retracting the solar array when the battery is charged.

20. The method according to claim 18, further comprising determining a daylight time and only deploying the solar array during the daylight time.

\* \* \* \* \*